United States Patent [19]
Herbst

[11] Patent Number: 5,250,239
[45] Date of Patent: Oct. 5, 1993

[54] PROCESS AND APPARATUS FOR CONTROLLING THE MOVEMENTS OF AN INJECTION MOLD AND A HANDLING DEVICE

[76] Inventor: Richard Herbst, Freisinger Str. 3B, D-8057 Eching, Fed. Rep. of Germany

[21] Appl. No.: 917,122

[22] PCT Filed: Feb. 5, 1991

[86] PCT No.: PCT/EP91/00221

§ 371 Date: Aug. 3, 1992

§ 102(e) Date: Aug. 3, 1992

[87] PCT Pub. No.: WO91/11314

PCT Pub. Date: Aug. 8, 1991

[30] Foreign Application Priority Data

Feb. 5, 1990 [DE] Fed. Rep. of Germany ....... 4003372

[51] Int. Cl.⁵ .................. B29C 45/42; B29C 45/80
[52] U.S. Cl. .................. 264/40.5; 264/334; 425/139; 425/150; 425/164; 425/556; 425/444; 901/6; 901/49; 414/225
[58] Field of Search ............ 264/40.1, 40.5, 328.1, 264/334; 425/139, 150, 165, 554, 556, 589, 444, 436 RM; 901/6, 49; 414/225

[56] References Cited

U.S. PATENT DOCUMENTS

| 4,368,018 | 1/1983 | Rees et al. ............ 425/139 |
| 4,822,233 | 4/1989 | Hänsel ................ 414/917 |

FOREIGN PATENT DOCUMENTS

| 2352736 | 7/1980 | Fed. Rep. of Germany . |
| 3631314 | 2/1988 | Fed. Rep. of Germany . |
| 61-249723 | 11/1986 | Japan . |
| 62-97815 | 5/1987 | Japan . |
| 62-99127 | 5/1987 | Japan . |
| 62-117720 | 5/1987 | Japan ................ 425/139 |
| 62-273816 | 11/1987 | Japan . |
| 2178358 | 2/1987 | United Kingdom . |

OTHER PUBLICATIONS (Mitsubishi Heavy Ind. Ltd.) Patent Abstracts of Japan, vol. 11, No. 316, M631, abstract from JP62-99127, Pub. Aug. 5, 1987.
(Sumitomo Heavy Ind. Ltd.) Patent Abstracts of Japan, vol. 12, No. 152, M695, abstract from JP 62-273816, Publ. Nov. 27, 1987.
(Fanus Ltd.) Patent Abstracts of Japan, vol. 11, No. 102, M576, abstract from JP 61-249723, Publ. Nov. 6, 1986.
(Japan Steel Works Ltd.) Patent Abstracts of Japan, vol. 11, No. 310, M630, abstract from JP 62-97815, Publ. May 7, 1987.

Primary Examiner—Jill L. Heitbrink
Attorney, Agent, or Firm—Chilton, Alix & Van Kirk

[57] ABSTRACT

In order to control the opening and closing movement of an injection mold (1, 3) and the feed and extraction movement of a handling device (7) for the removal of the molding in a manner which is optimally concerted with no delay, the opening movement of the mold and/or the extraction movement of the handling device is detected in relation to position and speed; if the speed lies in a reference range, a release signal is generated which triggers the feed movement of the gripping device or the closing movement of the mold.

9 Claims, 3 Drawing Sheets

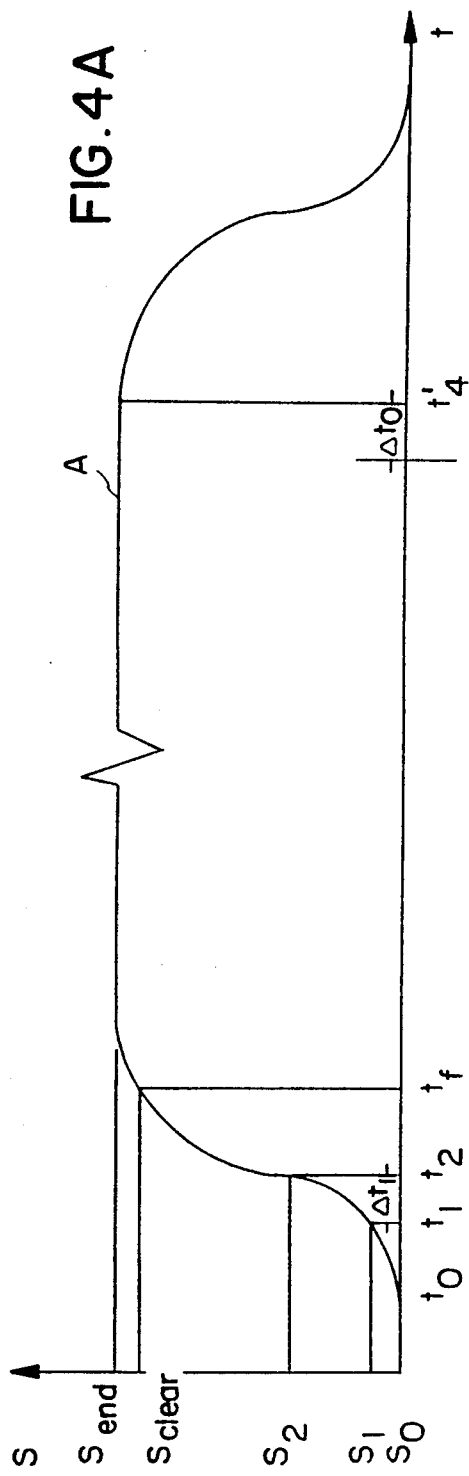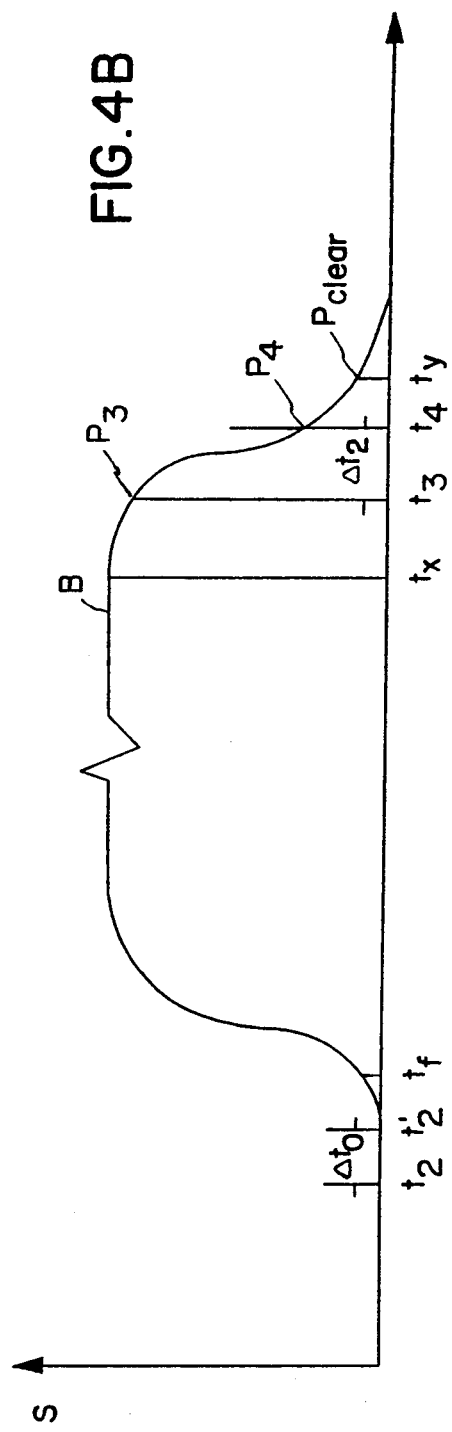

PROCESS AND APPARATUS FOR CONTROLLING THE MOVEMENTS OF AN INJECTION MOLD AND A HANDLING DEVICE

BACKGROUND AND SUMMARY OF THE INVENTION

The invention relates to a process and apparatus for controlling the movement of an injection mold and a handling device.

Injection molding machines and similar apparatuses for molding molded parts from plastic or from other materials are frequently operated in connection with a handling device, robot, manipulator or the like. The handling device or the like has a gripping tool, which can be extended in between the mold halves of the opened mold and withdrawn again, in order to remove the molded part from the mold. The opening and closing movements of the mold and the extending and withdrawing movements of the gripping tool must be carefully coordinated with one another in order that collisions and damage are reliably avoided even in cases of malfunctioning, but on the other hand no unnecessary time losses occur.

"Patent Abstracts of Japan", Volume 11, No. 315, M 631, discloses a control system for the gripping tool of an injection molding machine, in which the position of the movable injection mold is continuously sensed and used as a manipulated variable in a control loop controlling the position of the gripping tool. In an additional control loop, which controls the speed of the gripping tool, the positional deviations of the gripping tool and the reference speed of the movable mold serve as manipulated variables. This control apparatus is elaborate, since it is dependent on a constant position and speed sensing of the movable mold and a speed-controlled drive for the gripping tool. JP-A-62-273816 (Patent Abstracts of Japan, volume 12, No. 152, M 695) discloses an injection molding machine of which the gripping tool carries out a lifting and extending movement perpendicularly to the mold-opening movement and subsequently carries out a co-movement with the opening mold half. The lifting and extending movement commence simultaneously in time with the commencement of the opening of the mold, the co-traveling movement is controlled in dependence on the opening speed of the mold. This control apparatus is also complicated and elaborate, since it requires a gripping tool which can move in three spatial directions and a speed-controllable drive for the co-traveling movement of the gripping tool. If it were wished to apply the principle of these known control systems also to the withdrawing movement of the gripping tool and the closing movement of the mold, even more complicated means would be required for the constant speed control of the closing drive of the injection mold.

It is known to avoid collisions between tools moved at essentially constant, and mutually independent speed, such as for example molding tool and gripping tool, by arranging in each case in the travel of the molding tool and the gripping tool a position transmitter which generates a release signal when the tool concerned has, in its opening or withdrawing movement, reached a position at which the extending or closing movement of the other tool can be safely commenced and completed at a predetermined speed. The position at which the release signal is generated need not be the end position, for example of the opening stroke of the molding tool, but it must be ensured that, when generating the release signal, the molding tool has already covered part of its opening travel and has reached such a position that even if the molding tool jams in this position owing to a malfunction, the gripper can complete its extending movement, triggered by the release signal, without risk of damage. Analogously, the gripping tool emits a release signal for closing the molding tool when it withdraws from the region of the molding tool. This signaling point must also be set in such a way that, in the event of slow travel or a standstill of the gripping tool, damage during closing of the molding tool is ruled out in this position.

By virtue of these safety measures, the movement of the one tool can always be released position-dependently only when the other tool has already covered a considerable part of its movement stroke. Added to this is that both the generation of the release signal and the movement triggered by this in each case takes place with an unavoidable delay, which is caused by the response times of the position sensors, the switching times of the switching elements responding to the position signals and the operating times of the electric, hydraulic or pneumatic final control elements to be driven. These add up to produce considerable time losses, which are at the expense of the cycle rate of the injection molding machine or the like.

The invention is based on the object of designing a process and an apparatus of the specified type in such a way that the movement operations can be carried out with lower non-productive times and in a more favorable time overlap, without thereby increasing the risk of damage in the case of malfunction.

The object of the invention is achieved by providing a process for controlling the relative movement of a molding tool and a gripping tool of a molding machine. The molding tool is movable between a closed position for molding a material and a fully open position. The gripping tool is used to remove a molded workpiece for the molding tool, and is movable between an extended position in which a portion of the gripping tool is within the molding tool when the molding tool is not closed, and a withdrawn position. The process comprises the steps of determining the speed of movement of one of the molding tool and the gripping tool at an intermediate position, determining whether the speed of the one of the molding tool and the gripping tool falls within a predetermined reference range, and, if the speed falls within the reference range, generating a release signal for movement of the other of the molding tool and the gripping tool, and controlling the movement of the other of the molding tool and the gripping tool based upon the release signal.

Another aspect of the invention is a molding apparatus having a molding tool and a gripping tool. The molding tool moves between a closed position for molding the material and a fully open position. The gripping tool is used to remove a molded workpiece from the molding tool. The gripping tool moves between an extended position in which a portion of the gripping tool is within the molding tool when the molding tool is not closed, and a withdrawn position. the apparatus also includes signal generation means for generating a signal indicative of the position of one of the molding tool and gripping tool as a release signal for movement of the other of the molding tool and gripping tool. Furthermore, the apparatus includes control means for controlling the position of the other of the molding tool and the gripping tool. The signal generation means has speed measurement means including means for determining the movement speed of one of the molding tool and the gripping tool at an intermediate position before generating the release signal, and evaluation means to generate the release signal only if the movement speed falls within a predetermined reference range.

According to the invention, not only the position but in addition the speed of the moved tool is used as a criterion for generating the release signal for the other tool. The release signal is generated only if, on passing through the signaling position, the moved tool has a speed corresponding to proper operation. At too low—or possibly even too high—speed, operation is malfunctioned, and the generation of the release signal for the other tool does not occur. This makes it possible to generate the release signal at an earlier point in time of the movement stroke of the tool than was previously possible, in particular already at a position in which the tool has not yet completely cleared the path of movement of the other tool. Establishing that the tool has passed through this position at the proper speed offers adequate certainty that the tool will also properly cover the remaining part of its movement stroke and, as a result, clear the path of movement of the other tool in good time.

In a further refinement of the invention, a repeated or continuous monitoring of the positions and speeds of the two tools can also take place, and it can be established by computational extrapolation whether the two movements will proceed without collision. If there is the risk of collision, the computer can control a corresponding influence on one or both movements, ie. termination, braking or acceleration.

BRIEF DESCRIPTION OF THE DRAWINGS

An embodiment of the invention is explained with reference to the drawings, in which:

FIG. 4 shows time-travel diagrams of the two tools;

DETAILED DESCRIPTION OF THE INVENTION

The invention is explained below with reference to an injection molding apparatus for plastics, but can in principle be applied in the case of any molding machines having a gripping tool to be moved between the molding tools.

Figure 1:
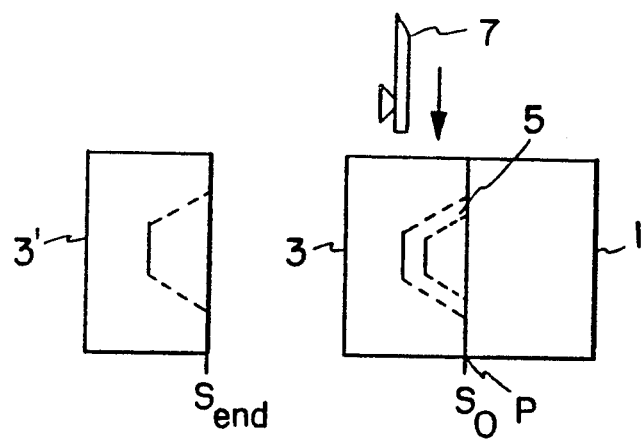
FIGS. 1–3 diagrammatically show a molding tool of an injection molding machine and a gripping tool of a handling device in various relative positions with respect to each other.

According to FIG. 1, an injection mold comprises two mold halves or molding tools 1 and 3, which in the closed position shown enclose a mold cavity 5 for producing a molded part, for example in the form of a hollow article. At least the molding tool 3 is movable and, for opening the mold, can be displaced by means of drive means (not shown) into the open position 3' indicated by dot-dashed lines. Any desired reference point P of the molding tool 3 in this case covers the path from the starting position $S_0$ to the end position $S_{end}$, or during the closing stroke covers the reverse path from $S_{end}$ to $S_0$. When the mold is open, a gripping tool 7, which belongs to a handling device, robot, manipulator or the like (not shown), can be extended between the molding tools 1, 3 in order to grasp the molded part, which is pushed out of the molding tool 3, for example by means of ejectors, and pass it on for further treatment.

Figure 2:
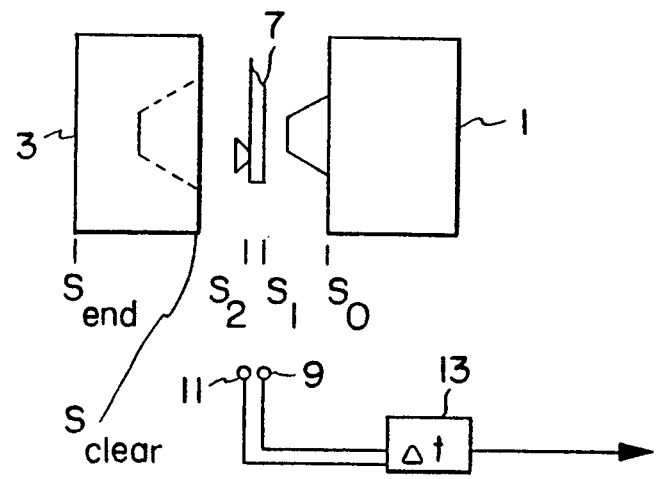

As shown in FIG. 2, the gripping tool 7 must not be extended until the mold half 3 has reached not its end position $S_{end}$ admittedly, but an intermediate position in which the extending travel for the gripping tool 7 is cleared. This position is indicated in FIG. 2 by $S_{clear}$. In the case of the process customary until now, the drive for extending the gripping tool is not started until the molding tool 3 has reached the position $S_{clear}$ and in this position a starting signal for the gripping tool 7 is generated.

According to the invention, however, the position of the movable molding tool 3 is sensed not at as late a stage as the position $S_{clear}$ but already at two positions before this, which are diagrammatically indicated in FIG. 2 at $S_1$ and $S_2$. These positions $S_1$, $S_2$ are assigned suitable signal transmitters 9, 11, by which the positions $S_1$ and $S_2$ of the movable molding tool 3 are sensed. These sensors are of any type and familiar to be a person skilled in the art, for example they may be mechanically actuated electric switches, contactless switches, light barriers, digital position pickups or the like. Sensing the positions $S_1$ and $S_2$ can also take place by means which are assigned to the pneumatic or hydraulic drive system for the molding tool.

The two sensors 9, 11 are connected to an evaluation device 13, in which the time interval $\Delta t$ which lies between the signals generated by the sensors 9 and 11 can be sensed. This time interval $\Delta t$, in which the molding tool 3 covers the path from $S_1$ to $S_2$, is a measure of the speed of the molding tool on passing through the position $S_2$. This time interval $\Delta t$ is compared with predetermined limits of a reference value range, and in an output line 13 a release signal is generated at the point in time at which the molding tool 3 passes through the position $S_2$, but only on condition that the measured time interval $\Delta t$, and consequently the speed of the molding tool 3, lies in the predetermined reference range. The commencement of the extending movement of the gripping tool 7 is triggered by the release signal.

As indicated in FIG. 2, it is possible by the process according to the invention to generate the release signal already at the position $S_2$ of the molding tool 3, although at this point in time the molding tool 3 has not yet completely cleared the extending travel for the gripping tool 7, ie. has not yet reached the position $S_{clear}$. If, owing to a malfunction, the molding tool were to come to a standstill in the position $S_2$, damage to the gripping tool 7 would be the consequence. However, measuring the time interval $\Delta t$ provides the guarantee that the release signal is generated in the position $S_2$ only if the molding tool 3 moves at a speed corresponding to normal operation. It can then be assumed, if only for reason of the mass inertia, that the molding tool 3 will still cover at least the travel path from $S_2$ to $S_{clear}$ even in the event of a malfunction, so that damage cannot occur during extending of the gripping tool 7.

Figure 3:
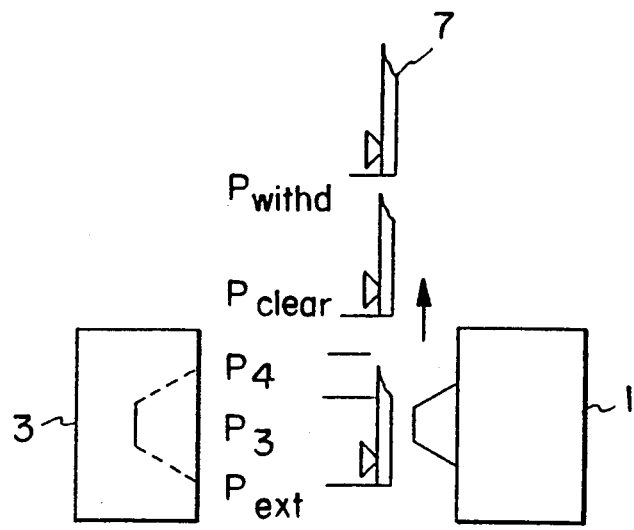

FIG. 3 illustrates how, in an analogous way, in the case of the withdrawal stroke of the gripping tool 7 the release signal is generated for the closing movement of the molding tool 3. The gripping tool 7 moves out of the completely extended position $P_{ext}$ into the completely withdrawn position $P_{withd}$ and thereby runs through a position $P_{clear}$, in which the closing travel for the molding tool 3 is completely cleared so that the molding tool 3 can be moved safely into the closed position (FIG. 1).

According to the prior art, a starting signal for the closing movement of the molding tool 3 is not generated until the gripping tool 7 has reached the position $P_{clear}$. According to the invention, however, two positions $P_3$ and $P_4$ of the gripping tool 7 are sensed by means of suitable sensors (not shown in FIG. 3) already before reaching the position $P_{clear}$, and from the signals of the sensors the time interval $\Delta t$ in which the gripping tool 7 covers the path from $P_3$ to $P_4$ is determined. If this interval $\Delta t$, and consequently the speed of the gripping tool 7, lies in the reference value range characteristic for normal operation, a release signal for the commencement of the closing movement of the molding tool 3 can be generated already in the position $P_4$ of the gripping device 7. The proper speed of the gripping tool 7, established at the point $P_4$, offers the guarantee that the gripping tool will also cover the remaining travel up to at least the position $P_{clear}$ and not hinder the closing movement of the molding tool 3.

FIG. 4 diagrammatically shows time-travel diagrams, the curve A being intended to reproduce the opening and closing stroke of the molding tool 3 and the curve B being intended to reproduce the extending and withdrawing stoke of the gripping tool 7. At the point in time $t_0$, the molding tool 3 commences its opening stroke up to the end position $S_{end}$ and thereby passes through the positions $S_1$ and $S_2$ sensed by sensors at the points in time $t_1$ and $t_2$. The time interval $\Delta t_1$ between the points in time $t_1$ and $t_2$ is sensed and compared with reference values. If the time interval lies in the reference value range, an release signal for the start of the movement of the gripping tool 7 is essentially generated at the point in time $t_2$. For triggering the movement of the gripping tool, an unavoidable, constant switching time $\Delta t_0$ is required, so that the extending movement of the gripping tool 7 is started at a point in time $t'_2$. This point in time $t'_2$ may, however, lie distinctly before the point in time $t_f$, at which the molding tool (curve A) passes through the position $S_{clear}$ (see FIG. 2), in which it no longer hinders the extending of the gripping tool.

In the withdrawal stroke of the gripping tool 7, which commences at the point in time $t_x$, the gripping tool passes through the positions $P_3$ and $P_4$ sensed by means of sensors, and, dependent on the time interval $\Delta t_4$ elapsed in between, at the point in time $t_4$ a release signal is generated, which in turn after a corresponding switching time $\Delta t_0$, at the point in time $t'_4$, controls the commencement of the closing stroke of the molding tool 3. This point in time $t'_4$ also lies before the point in time $t_y$, at which the gripping tool 7 in the position $P_{clear}$ (see FIG. 3) has fully cleared the path of movement of the molding tool 3. It can be appreciated that the invention permits a very favorable time overlap and optimum mutual adaptation of the movement operations, without sacrificing operational reliability.

Modifications of the embodiment described are possible within the scope of the invention. For instance, the position and speed sensing can take place in a way other than that described. For example, instead of fixed position signal transmitters, a position detector arranged on the movable part, such as mold half 3 or gripping tool 7, may be used, which position detector detects or scans two or more fixedly arranged travel markers, or else possibly a continuous sequence of travel increments. Instead of a measurement of the time interval between two positions, a direct speed measurement may also be performed by corresponding speed sensors. Consequently, for example one of the two position transmitters 9, 11 in FIG. 2 may be omitted and the other position transmitter assigned an additional speed sensor.

In a further refinement of the invention, a continuous position and speed monitoring of the two tools can take place during their entire movement. At any desired intermediate positions which one of the tools reaches, it can be inquired whether what is respectively the other tool has reached the position and speed required for the proper movement sequence. For explanation, reference is made to FIG. 5. Here, like in FIG. 4, the time-travel diagram is shown for the opening movement of the mold (curve A) and for the extending movement of the gripping tool (curve B), these movements, which in reality proceed at right angles to each other, being shown here oppositely directed in order to illustrate the possibility of collision.

Figure 5:
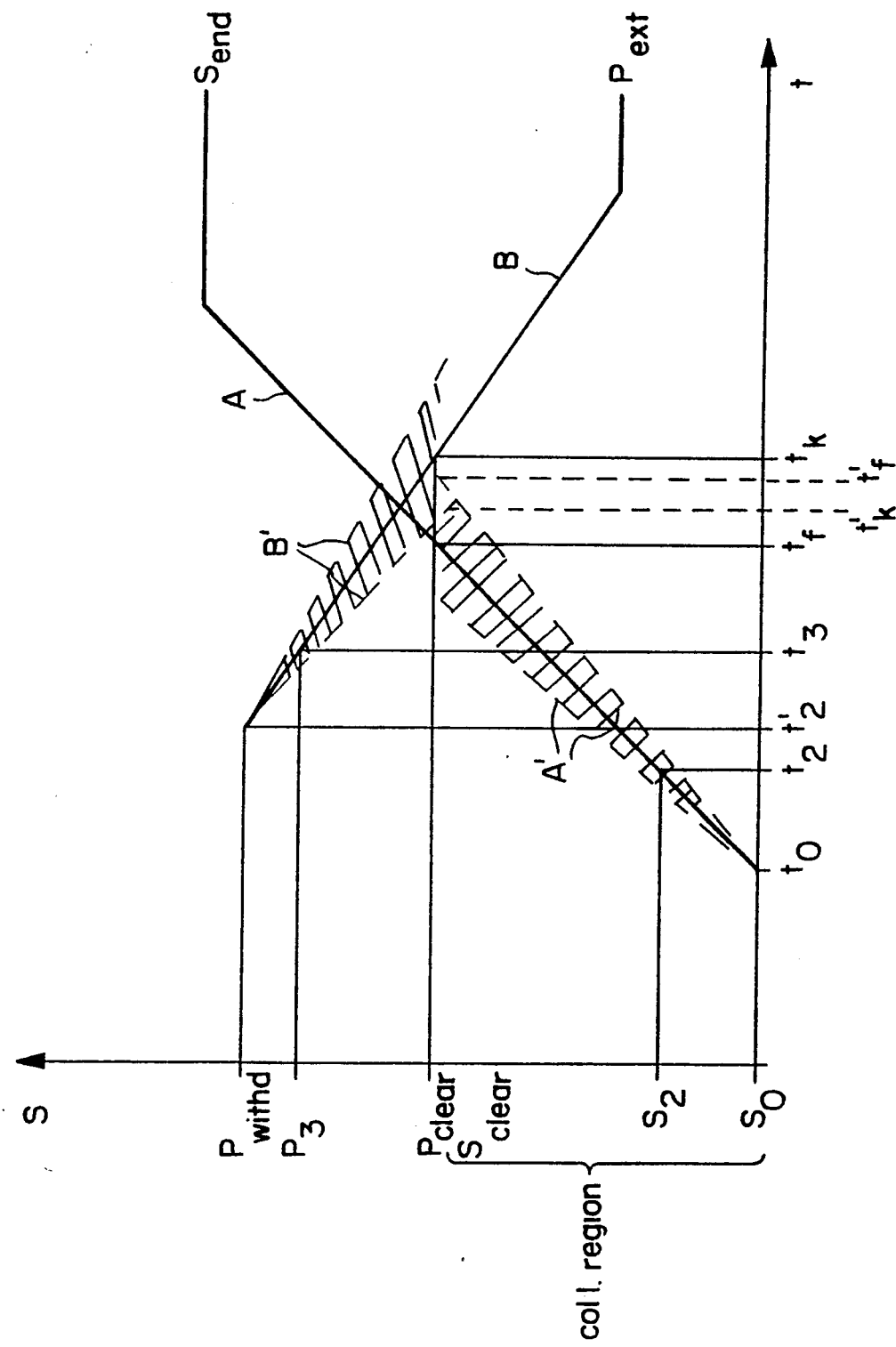
FIG. 5 shows another time-travel diagram of the two tools to illustrate the collision monitoring.

According to FIG. 5, at the point in time $t_0$, the molding tool commences its opening stroke until in the end position $S_{end}$ and during this passes at point in time $t_f$ through the clearance position $S_{clear}$, from which it can no longer hinder the extending movement of the gripping tool. The travel path from $S_0$ to $S_{clear}$ is the collision region. As long as the molding tool is still in this region, collisions with the extending gripping tool are possible. At the position $S_2$ at the point in time $t_2$, a position and speed measurement of the moved molding tool is carried out and, dependent on the measuring result, the release signal for the extending movement of the gripping tool is triggered after a time delay $\Delta_t$ at the point in time $t_2'$. Said gripping tool then moves out of the withdrawn position $P_{withd}$ into the fully extended position $P_{ext}$ and passes at the point in time $t_k$ through the position $P_{clear}$, at which the region of possible collisions with the molding tool begins. Since the molding tool has already left the collision region beforehand at the point in time $t_f$, a collision does not occur. According to the invention, the triggering point in time $t_2'$ for the extending movement of the gripping tool can be chosen such that the point in time $t_k$ lies after the point in time $t_f$ with certainty but as little after as possible.

In reality, the movements cannot be fixed exactly in time but have a range of tolerance, which is indicated in FIG. 5 by the dashed straight lines A' for the molding tool and B' for the gripping tool. Due to deviations in this range of tolerance, the points in time $t_f$ and $t_k$ may be shifted, for example to $t_f'$ and $t_k'$, so that the gripping tool can collide with the molding tool. In order to rule this out with certainty, the point in time $t_2'$ at which the extending movement of the gripping tool is triggered could be retarded appropriately, as a result of which however the advantage achieved by the invention would be partially lost again. In order to be able to operate with as early a triggering as possible of the extending movement of the gripping tool, ie. with greatest possible time overlap of the two movements, according to one embodiment of the invention it is envisaged to measure the position and speed, at least of the molding tool, once again at at least one further point in time $t_3$. It is particularly advantageous if this measurement is triggered when the gripping tool has reached an intermediate position $P_3$ which can be sensed by position pickups. This means in other words that, on passing through the position $P_3$, the gripping tool "inquires" the position and speed of the molding tool at the point in time $t_3$. This may be repeated at further points in time, or else take place continuously during the entire movement of molding tool and gripping tool before reaching the position $P_{clear}$. The inquired measured values are then fed to a computer, which on the basis of the sensed positions and speeds extrapolates the movements of the molding tool and gripping tool and establishes whether a collision is avoided with adequate certainty or whether signals generated by means of the computer have to be used to intervene in the control of the two movements.

I claim:

1. A process for controlling the relative movement of a molding tool and a gripping tool of a molding machine, the molding tool being moveable between a closed position for molding a material and a fully open position, the gripping tool being used to remove a molded workpiece from the molding tool and being movable between an extended position in which a portion of the gripping tool is within the molding tool when the molding tool is not closed and a withdrawn position, the method comprising:
   determining the speed of movement of one of the molding tool and the gripping tool at at least one intermediate position,
   determining whether the speed of the one of the molding tool and the gripping tool falls within a predetermined reference range, and
   if the speed of the one of the molding tool and the gripping tool falls within the predetermined reference range, generating a release signal for movement of the other of the molded tool and the gripping tool, and controlling the movement of the other of the molding tool and the gripping tool based upon the release signal.

2. The process as claimed in claim 1, wherein the release signal is generated before the point in time at which the one of the molding tool and the gripping tool has reached a position at which it can no longer hinder the movement of the other of the molding tool and the gripping tool.

3. The process as claimed in claim 1, wherein a further speed measurement takes place at at least one further intermediate position of the one of the molding tool and the gripping tool, and wherein a control signal for influencing the movement of the other of the molding tool and the gripping tool is triggered if the measured speed does not lie in a reference range.

4. The process as claimed in claim 3, wherein the further speed measurement is initiated when the other of the molding tool and the gripping tool has reached a predetermined intermediate position of its movement.

5. The process as claimed in claim 1, wherein the speed and position of each of the molding tool and the gripping tool is continuously monitored, and the measured values of speed and position are fed to a computer in order to establish, by computational extrapolation, whether movement of the molding tool and gripping tool will proceed without collision, and wherein, if this is not the case, a control signal for influencing the movement of one of the molding tool and the gripping tool is generated.

6. A molding apparatus, including a molding tool which moves between a closed position for molding a material and a fully open position, a gripping tool for removing a molded workpiece from the molding tool, th gripping tool moving between an extended position in which a portion of the gripping tool is within the molding tool when the molding tool is not closed and a withdrawn position, signal generation means for generating a signal indicative of the position of one of the molding tool and gripping tool as a release signal for movement of the other of the molding tool and gripping tool, and control means for controlling the position of the other of the molding tool and the gripping tool, the signal generation means having speed measurement means including means for determining the movement speed of the one of the molding tool and the gripping tool at at least one intermediate position before generating the release signal, and evaluation means to generate the release signal only if the movement speed falls within a predetermined reference range.

7. The apparatus as claimed in claim 6, wherein the speed measurement means further includes means for measuring the speed of each of the molding tool and gripping tool at a plurality of locations.

8. The apparatus as claimed in claim 7, wherein measurement of the speed of each of the molding tool and the gripping tool is triggered by a signal generated by the other of the molding tool and the gripping tool.

9. The apparatus as claimed in claim 7, wherein the speed measurement means is a computer with prevents collisions of the molding tool and gripping tool.

* * * * *